(12) United States Patent
Parmeter

(10) Patent No.: US 6,300,699 B1
(45) Date of Patent: Oct. 9, 2001

(54) MOTOR COMPENSATING SPRING

(75) Inventor: Larry James Parmeter, Bartlesville, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/420,970

(22) Filed: Oct. 20, 1999

(51) Int. Cl.[7] ............... H02K 5/10; H02K 5/16; F04B 17/00
(52) U.S. Cl. ............... 310/87; 310/90; 417/423.3
(58) Field of Search ............... 310/87, 90, 51; 417/410.1, 423.3, 423.7, 365

(56) References Cited

U.S. PATENT DOCUMENTS

| | | |
|---|---|---|
| 2,931,307 * | 4/1960 | Smith ............... 310/87 |
| 3,816,782 | 6/1974 | Dow et al. ............... 310/90 |
| 4,319,150 * | 3/1982 | Roddy et al. ............... 310/89 |
| 4,350,911 | 9/1982 | Wilson et al. ............... 310/87 |
| 4,438,361 | 3/1984 | Manson ............... 310/90 |
| 4,466,165 * | 8/1984 | Otto ............... 29/149.5 PM |
| 4,471,246 * | 9/1984 | Paillet ............... 310/42 |
| 4,613,778 | 9/1986 | Wrobel et al. ............... 310/90 |
| 4,745,316 * | 5/1988 | Nakashima et al. ............... 310/87 |
| 5,367,214 | 11/1994 | Turner, Jr. ............... 310/87 |

* cited by examiner

Primary Examiner—Nestor Ramirez
Assistant Examiner—Dang Dinh Le
(74) Attorney, Agent, or Firm—Bracewell & Patterson, L.L.P.

(57) ABSTRACT

An electric motor having a rotatable shaft centrally located within a cylindrical stator bore in a housing. A first retaining ring engages the shaft, and a rotor stack is supported axially slidably on the shaft. A second retaining ring engages the shaft above the rotor stack and is positioned a distance above the rotor stack to allow for free thermal expansion of the rotor stack. A spring locates between one of the retaining rings and the shaft to bias the rotor stack against the other retainer ring.

11 Claims, 1 Drawing Sheet

MOTOR COMPENSATING SPRING

TECHNICAL FIELD

This invention relates to a motor configuration for controlling movement of components therein. More specifically, this invention relates to a configuration of an axial motor, such as a submersible pump motor, which allows variations in thermal expansion of the motor shaft and other components while protecting the components from damage during shipping and start-up.

BACKGROUND ART

Axial motors, such as a submersible pump motor, have multiple rotors, each separated by a rotor bearing and retained on the motor's central shaft by retaining rings. These rotors are constructed primarily from copper while the shaft is primarily steel. As the motor runs, it generates heat and causes the components to expand. There is a substantial difference in the rate of thermal expansion between copper and steel, thus the rotors expand significantly more than the shaft. In some cases, this difference in expansion can result in the rotor stack being as much as half an inch longer than the shaft. If the rotor stack is constrained by the retaining rings and not allowed to expand relative to the shaft, the rotors expand into the bearings and prevent the bearings from rotating. The friction from the locked bearings causes tremendous heat and ultimate failure.

The prior art motors have loosely fit the rotor stacks on the central shaft, allowing a clearance between the rotor stack and the upper retaining ring. This provides room into which the rotors can expand and prevents the rotors from expanding into the bearings. However, the clearance introduces new problems. The rotors of the prior art can freely slide on the shaft and be damaged as they slam into each other during transport. Further, during start-up, the rotor stack can jump upwards on the shaft. As the rotor stack settles down, one or more rotor bearings can become misaligned and wedge in the stator bore. A wedged bearing may prevent the rotors beneath from expanding freely as the motor warms up, and as discussed above, prevent the bearings from rotating and cause a motor failure.

Therefore, there is a need for a motor that allows for the variance in thermal expansion of the rotor stacks and central shaft, yet protects the rotor stack from damage during transport and prevents rotor bearing misalignment and failure at start-up.

SUMMARY OF THE INVENTION

The present invention is directed to a motor configuration that allows for the variance in thermal expansion of the rotor stacks and central shaft while protecting the rotor stack from damage during transport and preventing misalignment and failure at start up. The motor has a housing with cylindrical stator and a centrally mounted shaft. A retaining ring is mounted on the shaft and a rotor stack is carried to slide axially on the shaft. The rotor stack is biased against the retaining ring. In a preferred embodiment, a spring is mounted above the rotor stack, between the rotor stack and a second retaining ring. The spring abuts both the rotor stack and the second retaining ring and is sized to limit free axial sliding of the rotor stack yet allow for thermal expansion of the rotor stack.

BEST MODE FOR CARRYING OUT THE INVENTION

Figures 1A, 1B:
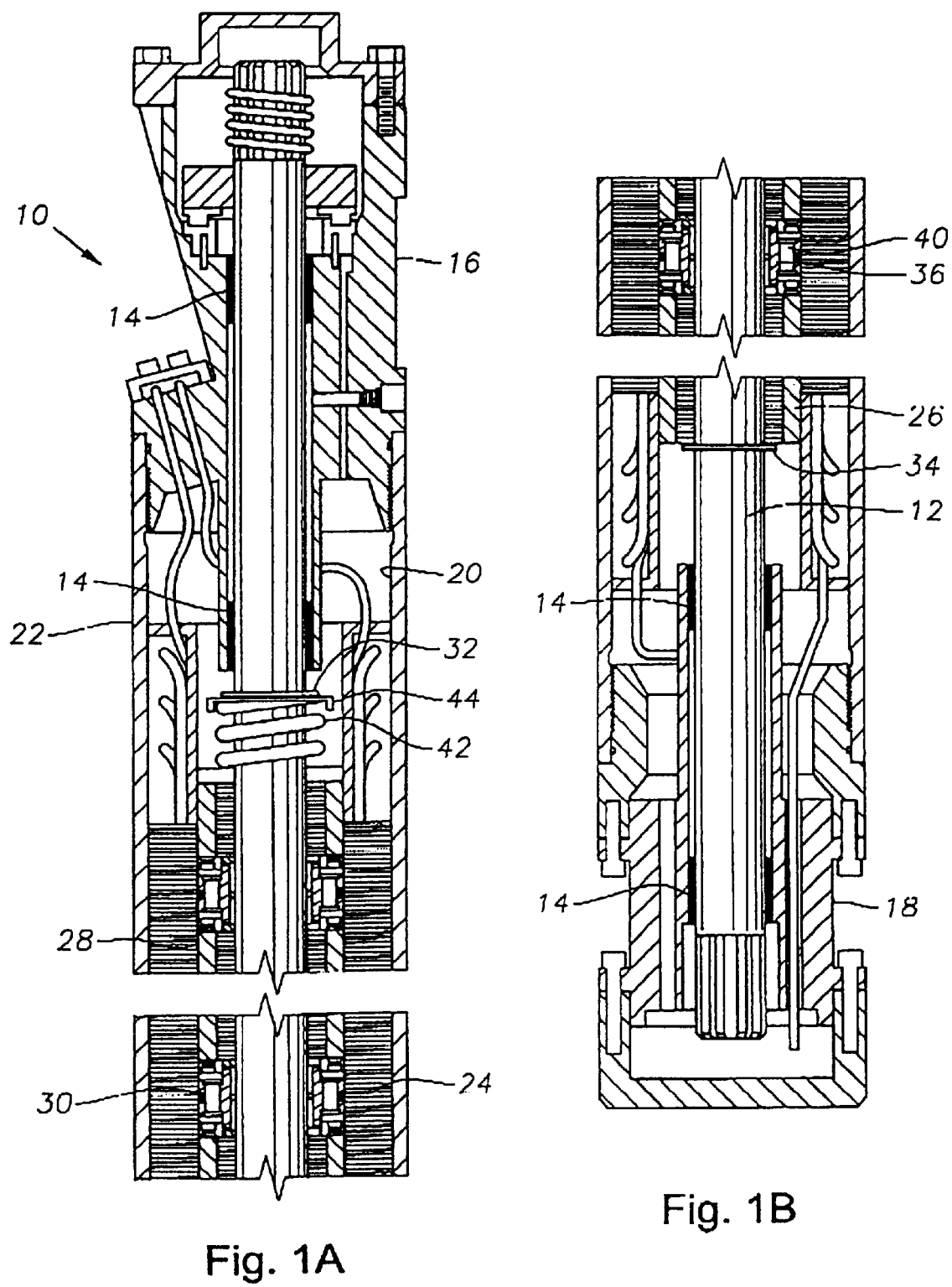
FIG. 1A is the upper portion of a sectional view of a motor constructed in accordance with this invention.
FIG. 1B is the lower portion of a sectional view of a motor constructed in accordance with this invention.

Referring to FIGS. 1A and 1B, a typical electric motor 10 for use in an electrical submersible pump has a central shaft 12 supported by a plurality of bearings 14. The bearings may be pressed into a head 16 or a base 18 of the electric motor 10, or the bearings may be free to rise up or down within the stator bore 20. Stator bore 20 is located within a cylindrical housing 22 that is typically filled with a dielectric liquid or oil.

The electric motor 10 has a cylindrical stator 24 carried in stator bore 20 within housing 22. Central shaft 12 passes concentrically through cylindrical stator 24, carrying a rotor stack 26 such that stack 26 can slide axially on shaft 12. Rotor stack 26 is comprised of a plurality of rotor sections 28 separated by rotor bearing assemblies 30. Each bearing assembly 30 includes a sleeve 36 that is engaged to shaft 12 and bearings 40 in engagement with the outer surface of sleeve 36. Bearings 40 additionally engage the inner surface of cylindrical stator 24. Stack 26 is axially retained on shaft 12 between an upper retaining ring 32 and a lower retaining ring 34, and is keyed (not shown) to rotate with shaft 12. Upper retaining ring 32 and lower retaining ring 34 engage shaft 12.

A compensating spring 42, concentric about shaft 12, abuts rotor stack 26 and biases it downward against lower retaining ring 34 with enough force to prevent free movement of rotor stack 26 yet allow thermal expansion of rotor sections 28. Spring 42 is retained by an upper perch 44 which abuts upper retaining ring 32. Preferably, spring 42 is a coil spring, however, spring 42 may also be a plurality of spring washers or similar compressible stack. Further, while spring 42 is shown on an upper end of rotor stack 26, it could alternately be located at a bottom of the rotor stack.

Shaft 12 is constructed substantially from steel and rotor sections 28 are constructed primarily from copper. Copper has a higher rate of thermal expansion than steel, so as motor 10 heats up, shaft 12 expands less than rotor sections 28. To compensate for this, the distance between upper retaining ring 32 and lower retaining ring 34 is greater than the height of rotor stack 26. This distance is sized to allow free expansion of rotor sections 28 relative to shaft 12 throughout the operating temperature range of motor 10.

In use, spring 42 keeps rotor stack 26 together and biased against lower retaining ring 34 while allowing rotor sections 28 to expand. As motor 10 begins to run, it also begins to generate heat and all the motor components expand. Although shaft 12 expands as it heats, rotor sections 28 expand at a greater rate and compress spring 42. When motor 10 is shut off, it begins to cool and rotor section 28 contracts allowing spring 42 to expand.

The invention has several advantages. Because the rotor stack is biased against the lower retaining ring, the rotor sections cannot freely slide along shaft. Thus, the rotor sections are less likely to be damaged in transit from sliding and colliding with one another when the motor is jostled. Further, at start-up the spring counteracts the tendency of the rotor stack to jump, and thus prevents the bearing assemblies from becoming wedged.

While the invention has been shown in only one of its forms, it should be apparent to those skilled in the art that it is not so limited, but is susceptible to various changes without departing from the scope of the invention.

What is claimed is:

1. An electric motor for a downhole electrical submersible pump comprising:

a housing;

a cylindrical stator stationarily mounted in said housing;

a rotatable shaft centrally located in said cylindrical stator;

a first retainer spaced apart from a second retainer, said first and second retainers engaging said shaft for movement therewith;

a rotor stack axially slidably carried on said shaft between said retainers and said first retainer; and a biasing member that urges the rotor stack against said first retainer.

2. The electric motor of claim 1 wherein the first retainer is located at a lower end of said rotor stack and the second retainer is located above an upper end of said rotor stack.

3. An electric motor for a downhole electrical submersible pump comprising:

a housing;

a cylindrical stator stationarily mounted in said housing;

a rotatable shaft centrally located in said cylindrical stator;

a first retainer spaced apart from a second retainer, said first and second retainers engaging said shaft for movement therewith;

a rotor stack axially slidably carried on said shaft between said retainers and biased against said first retainer; and wherein the rotor stack is biased against the first retainer by a spring.

4. The electric motor of claim 3 wherein said spring is sized to dampen free axial sliding of said rotor stack due to shock while said motor is being transported yet allow thermal expansion of said rotor stack.

5. The electric motor of claim 2 wherein the spring is positioned between said second retainer and said rotor stack.

6. An electric motor for a downhole electrical submersible pump comprising:

a housing;

a cylindrical stator stationarily mounted in said housing;

a rotatable shaft centrally located in said cylindrical stator;

a first retainer spaced apart from a second retainer, said first and second retainers engaging said shaft for movement therewith;

a rotor stack axially slidably carried on said shaft between said retainers and biased against said first retainer; and wherein the rotor stack is biased against the first retainer by a resilient member positioned between said second retainer and said rotor stack.

7. An electric motor for a downhole electrical submersible pump comprising:

a housing;

a cylindrical stator stationarily mounted in said housing;

a rotatable shaft centrally located in said cylindrical stator;

a rotor stack concentrically accepted on said shaft to slide axially;

a first retainer engaging said shaft for movement therewith and adjacent to a first end of said rotor stack; and a spring on said rotor shaft in engagement with a second end of said rotor stack and biasing said rotor stack against said first retainer.

8. The electric motor of claim 7 wherein said spring is sized to dampen free axial sliding of said rotor due to shock, while said motor is being transported yet allow thermal expansion of said rotor stack.

9. The electric motor of claim 7 wherein the second end of said rotor stack is located above the first end during operation.

10. The electric motor of claim 7 wherein said spring is a coil spring.

11. The electric motor of claim 7 further comprising a second retainer engaging said shaft, wherein said spring is positioned between said second retainer and said rotor stack.

* * * * *

UNITED STATES PATENT AND TRADEMARK OFFICE
CERTIFICATE OF CORRECTION

PATENT NO. : 6,300,699 B1
DATED : October 9, 2001
INVENTOR(S) : Larry James Parmeter It is certified that error appears in the above-identified patent and that said Letters Patent is hereby corrected as shown below:

<u>Column 3,</u>
Line 13, after "said" (first occurrence) insert -- second --; same line delete "retainers" and insert therefor -- retainer --

Signed and Sealed this

Twentieth Day of August, 2002

Attest:

Attesting Officer

JAMES E. ROGAN
*Director of the United States Patent and Trademark Office*